T. E. MURRAY.
PROCESS OF ELECTRICAL MOLDING.
APPLICATION FILED DEC. 10, 1917.
1,259,275. Patented Mar. 12, 1918.
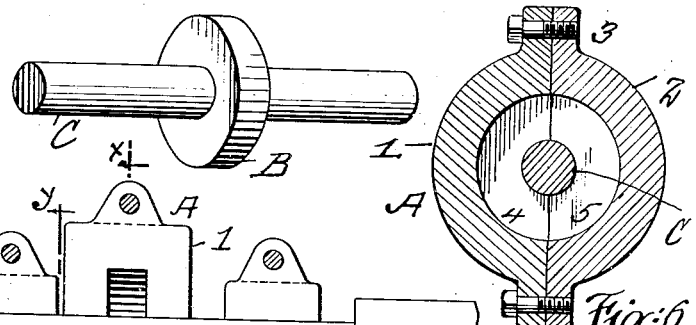
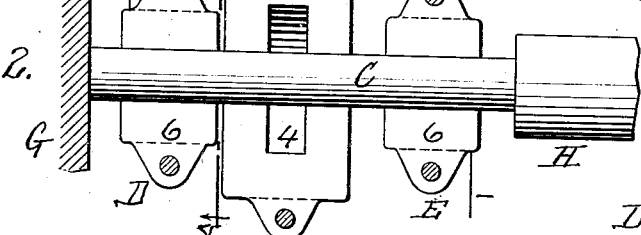
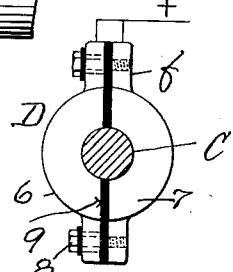
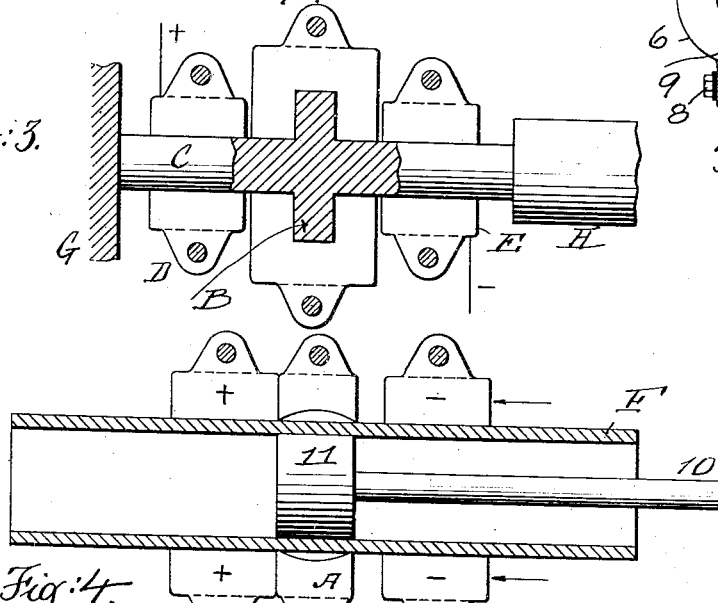
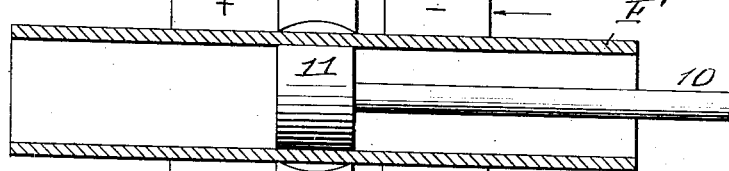
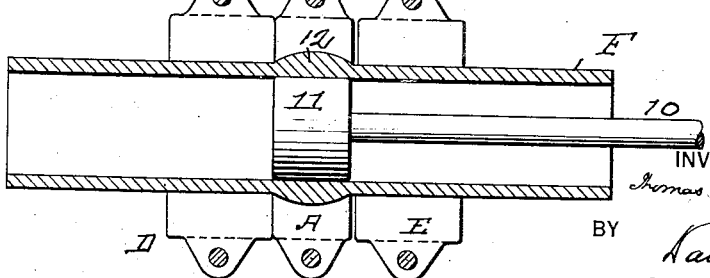
INVENTOR
Thomas E. Murray
BY
His ATTORNEY

UNITED STATES PATENT OFFICE.

THOMAS E. MURRAY, OF NEW YORK, N. Y.

PROCESS OF ELECTRICAL MOLDING.

1,259,275.  Specification of Letters Patent.  Patented Mar. 12, 1918.

Application filed December 10, 1917. Serial No. 206,403.

*To all whom it may concern:*

Be it known that I, THOMAS E. MURRAY, a citizen of the United States, residing at New York, in the county of New York and State of New York, have invented a certain new and useful Improvement in Processes of Electrical Molding, of which the following is a specification.

The invention is the process of electrical molding. I carry this process into effect by electrically heating the body to be molded to a plastic state, and subjecting said body to pressure while inclosed in a mold. In this way I cause the body to assume the size and configuration imposed by the mold matrix, from which, after cooling and hardening, it is finally removed. I herein illustrate means whereby my process may be carried into practical effect.

In the accompanying drawings—

Figure 1 is a perspective view of a cylindrical rod having an enlargement, here in the form of a circular flange or collar, electrically molded thereon by my method. Fig. 2 shows the rod seated in halves of the mold and electrodes, prior to the molding operation. Fig. 3 is a similar view, showing the enlargement molded and in section. Fig. 4 is a longitudinal section of a tube seated in halves of the mold and electrodes, and receiving the internal supporting cylinder (shown in elevation) prior to the molding operation. Fig. 5 is a similar view, showing the enlargement molded and in section. Fig. 6 is a transverse section on the line $x$, $x$ of Fig. 2. Fig. 7 is a transverse section on the line $y$, $y$ of Fig. 2.

Similar numbers and letters of reference indicate like parts.

The mold A is formed in two similar half sections 1, 2, united by lugs and bolts 3. In each half section is a recess 4, 5. When the sections are united, the recesses register to form a matrix, which is to correspond in size and configuration to the desired enlargement to be produced. If, for example, it is desired to produce a collar or flange, as shown at B, Fig. 1, upon a rod C, then there are openings in the walls of the sections, through which rod C is inserted, and an annular recess formed by the registration of half recesses 4, 5 surrounding said openings, and hence said rod when in place.

The electrodes D, E are also made in half sections, as 6, 7, to receive the rod C between them and to fit thereon, as shown in section in Fig. 7, and said half sections are held together by lugs and bolts 8. Between the sections 6, 7 is insulation, shown at 9. Both sections of electrode D are connected to one circuit terminal, and both sections of electrode E are connected to the other circuit terminal of the leads to the source of heating current supply.

When it is desired to form an enlargement around a tube F, I insert into said tube, by means of a rod 10, a cylinder 11, which is preferably to be as long as the recess in the mold is wide.

I proceed as follows:

The object—here rod C—upon which the enlargement is to be made is placed in the mold A, the sections of which are clamped together. The electrodes D, E are clamped upon said rod on opposite sides of the mold. The heating current being established, passes from one electrode, as D, to the other electrode E, longitudinally through the rod C, rendering the metal thereof plastic. When this condition is reached, the rod is subjected, by any suitable means, to endwise compression. One way of doing this, shown in Figs. 2 and 3, is to rest one end of the rod against an abutment, as G, and to apply pressure to the other end of the rod in a direction longitudinal to said rod by means of a moving pusher or tool H. The effect of this compression is to force the plastic metal to enter the matrix in the mold A, filling said matrix and taking the shape thereof, and shortening the rod, as shown in Fig. 3. The heating current is then cut off, and after the metal has hardened, the rod is removed from the apparatus.

In like manner, the tube F in Figs. 4, 5 may be subjected to endwise compression, after being heated to plastic state. The cylinder 11 is inserted in order to support the tube wall and prevent the flow of the plastic metal or the bending of the tube wall into the bore of the tube. The shape of the mold A is here such as to produce a convex bead 12 around said tube. After compression, the tube is shortened, as shown in Fig. 5.

I claim:

1. The method of electrical molding, which consists in electrically heating a body of metal to a plastic state, forcing said body while so plastic into a matrix to cause said body to fill said matrix and assume the size and configuration thereof, interrupting the heating current, and separating said body and said matrix.

2. The method of electrical molding, which consists in inserting a body of metal into a mold, electrically heating said body to a plastic state, subjecting said body while so plastic to compression to cause said body to fill said mold, interrupting the heating current, and separating said body and said mold.

3. The method of electrical molding, which consists in inserting a body of metal through openings in walls of a mold, electrically heating said body to a plastic state, subjecting said body while so plastic to endwise compression to cause said body to fill said mold, interrupting the heating current, and separating said body and said mold.

4. The method of producing a solid enlargement surrounding an elongated metal body, which consists in placing said body between mold sections having registering recesses unitedly forming a matrix of a size and configuration corresponding to the desired enlargement, electrically heating said body to a plastic state, and subjecting said body while so plastic to endwise compression, whereby the plastic metal is caused to fill said matrix and assume the shape thereof, interrupting the heating current, and finally removing said mold sections from said body.

5. The method of producing a solid enlargement surrounding a metal tube, which consists in placing said tube between mold sections having registering recesses unitedly forming a matrix of a size and configuration corresponding to the desired enlargement, inserting a solid cylinder in said tube, electrically heating said tube to a plastic state, and subjecting said tube while so plastic to endwise compression, whereby the plastic metal is caused to fill said matrix and assume the shape thereof, interrupting the heating current, and finally removing said mold sections and cylinder from said tube.

In testimony whereof I have affixed my signature in presence of two witnesses.

THOMAS E. MURRAY.

Witnesses:
GERTRUDE T. PORTER,
MAY T. McGARRY.